(12) United States Patent
Prokopenko et al.

(10) Patent No.: US 7,246,218 B2
(45) Date of Patent: Jul. 17, 2007

(54) SYSTEMS FOR INCREASING REGISTER ADDRESSING SPACE IN INSTRUCTION-WIDTH LIMITED PROCESSORS

(75) Inventors: Boris Prokopenko, Milpitas, CA (US); Timour Paltashev, Fremont, CA (US); Derek Edward Davout Gladding, San Francisco, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 207 days.

(21) Appl. No.: 10/978,342

(22) Filed: Nov. 1, 2004

(65) Prior Publication Data

US 2006/0095735 A1     May 4, 2006

(51) Int. Cl.
*G06F 9/30*     (2006.01)
(52) U.S. Cl. .................. 712/208; 712/210; 712/213
(58) Field of Classification Search ............. 712/208, 712/210, 213
See application file for complete search history.

(56) References Cited

U.S. PATENT DOCUMENTS

| | | | | |
|---|---|---|---|---|
| 5,165,038 A | * | 11/1992 | Beard et al. ................ | 711/147 |
| 5,301,340 A | * | 4/1994 | Cook .......................... | 712/24 |
| 5,613,152 A | * | 3/1997 | Van Meerbergen et al. ... | 712/23 |
| 6,219,777 B1 | * | 4/2001 | Inoue ......................... | 712/23 |
| 6,629,232 B1 | * | 9/2003 | Arora et al. ................. | 712/29 |

OTHER PUBLICATIONS

Patterson et al, Computer Organization & Design, 1998, Morgan Kaufman Publishers, 2nd Edition.*

* cited by examiner

*Primary Examiner*—Donald Sparks
*Assistant Examiner*—Vincent Lai
(74) *Attorney, Agent, or Firm*—Thomas, Kayden, Horstemeyer & Risley

(57) ABSTRACT

A system for executing instructions is presented. In some embodiments, among others, the system comprises functional units, local multiplexers, local register files, and a global register file, which are communicatively coupled to each other and arranged to accommodate shortened instruction words in multiple-issue processors. These components are arranged to permit greater access to registers by instructions, thereby permitting reduction of the word length, as compared to conventional very long instruction word (VLIW) processors.

10 Claims, 5 Drawing Sheets

SYSTEMS FOR INCREASING REGISTER ADDRESSING SPACE IN INSTRUCTION-WIDTH LIMITED PROCESSORS

FIELD OF THE INVENTION

The present disclosure relates generally to computer architecture and, more particularly, to computer processors.

BACKGROUND

Very long instruction word (VLIW) processors are known in the art, an example of which is shown in FIG. 1. As shown in FIG. 1, a conventional processor includes an instruction decoder 105, control sequencing hardware 115, an input/output buffer 130, one or more register files 110, and one or more functional units 120 (which are also referred to as issue slots).

Given this architecture, instructions enter the instruction decoder 105 from an external source. The instruction decoder 105 converts the received instructions into a decoded internal format that is wider but easier to process. The decoded instructions are subsequently used to control the operation of the data path components, which include the input/output buffer 130, the register file 110, and the functional units 120. Since the various operation of conventional processors is known in the art, only a truncated discussion of such processors is provided herein.

The register file 110, which holds temporary working data, is relatively quickly accessible compared to external memory. The functional units (or issue slots) 120 perform the actual computational work associated with the processor.

The control sequencing hardware 115, the register file 110, and the functional units 120 are shown in greater detail in FIG. 2. As shown in FIG. 2, the control sequencing hardware 115 issues an instruction word, which includes control bits (RFC) associated with the register file 110, and control bits (FnC) associated with each of the functional units 120. Given the multiple functional units 120a...120d, the processor of FIG. 2 is capable of performing multiple operations per clock cycle. A more concrete example is provided with reference to FIG. 3.

Specifically, FIG. 3 shows control sequencing hardware 315 coupled to a 64-entry, 32-bit register file 310 and four functional units 322, 324, 326, 328. Given the four functional units 322, 324, 326, 328, the processor of FIG. 3 is capable of performing four operations per clock cycle. For illustrative purposes, the four functional units of FIG. 3 are a first adder 322, a second adder 324, a first multiplier 326, and a second multiplier 328. Thus, the four operations include two (2) addition operations and two (2) multiplication operations.

Each functional unit 322, 324, 326, 328 has two read ports, through which the functional unit receives data, and a single write port, through which the functional unit outputs data. In other words, for the example in FIG. 3, each functional unit receives two values, performs an operation with the two values, and outputs a single value as a result of the performed operation. Specifically, as shown in FIG. 3, the first adder 322 receives R1 and R2 from the register file 310, and also control signal A1C from the control sequencing hardware 315. The first adder 322 performs an add operation on R1 and R2 in response to the control signal A1C. The result of the operation is then output as W1. Similarly, the second adder 324 receives R3 and R4, and outputs W2 in response to control signal A2C. The first multiplier receives R5 and R6, and outputs W3 in response to control signal M1C. And the second multiplier 328 receives R7 and R8, and outputs W4 in response to control signal M2C.

If the register file 310 is a sixty-four (64) entry, thirty-two (32) bit register file, then six (6) bits are required to access the 64-entry register file 310. Thus, if each instruction has a two (2) bit operation field, and 6 bits are required to access the 64-entry register file 310, then the processor would operate on 80-bit instruction words (designated herein as INST[79:0]). For example, the values of R1 through R8 (values that appear on each of the read ports of the register file 310), W1 through W4 (values that appear on each of the write ports of the register file 310), and the control bits for each of the functional units can be represented as:

R1=INST[79:74]
R2=INST[73:68]
W1=INST[67:62]
A1C=INST[61:60]
R3=INST[59:54]
R4=INST[53:48]
W2=INST[47:42]
A2C=INST[41:40]
R5=INST[39:34]
R6=INST[33:28]
W3=INST[27:22]
M1C=INST[21:20]
R7=INST[19:14]
R8=INST[13:08]
W4=INST[07:02]
M2C=INST[1:0]

Given the 64-entry, 32-bit register file 310 of FIG. 3, and the two bits required for the operation, the cost of the register file would be:

(64 entries)×(32 bits)×(8 read ports+4 write ports)
=24576 bits

As is known, for VLIW processors, each instruction usually contains several operand address fields per operation. Given the high instruction width of such processors, the cost of on-chip storage increases while the efficiency of off-chip instruction decreases. This is often the primary limiting factor in system performance. For at least this reason, there is a heretofore-unaddressed need in the industry.

SUMMARY

Some embodiments, among others, provide schemes in which the register space of a processor is modified to permit greater access to registers by instructions. Such modifications permit shorter instruction words for multiple-issue devices, thereby reducing instruction fetch bandwidth and, correspondingly, on-chip costs associated with the storage of the instruction words.

Other systems, devices, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components

DETAILED DESCRIPTION OF THE EMBODIMENTS

Figure 1:
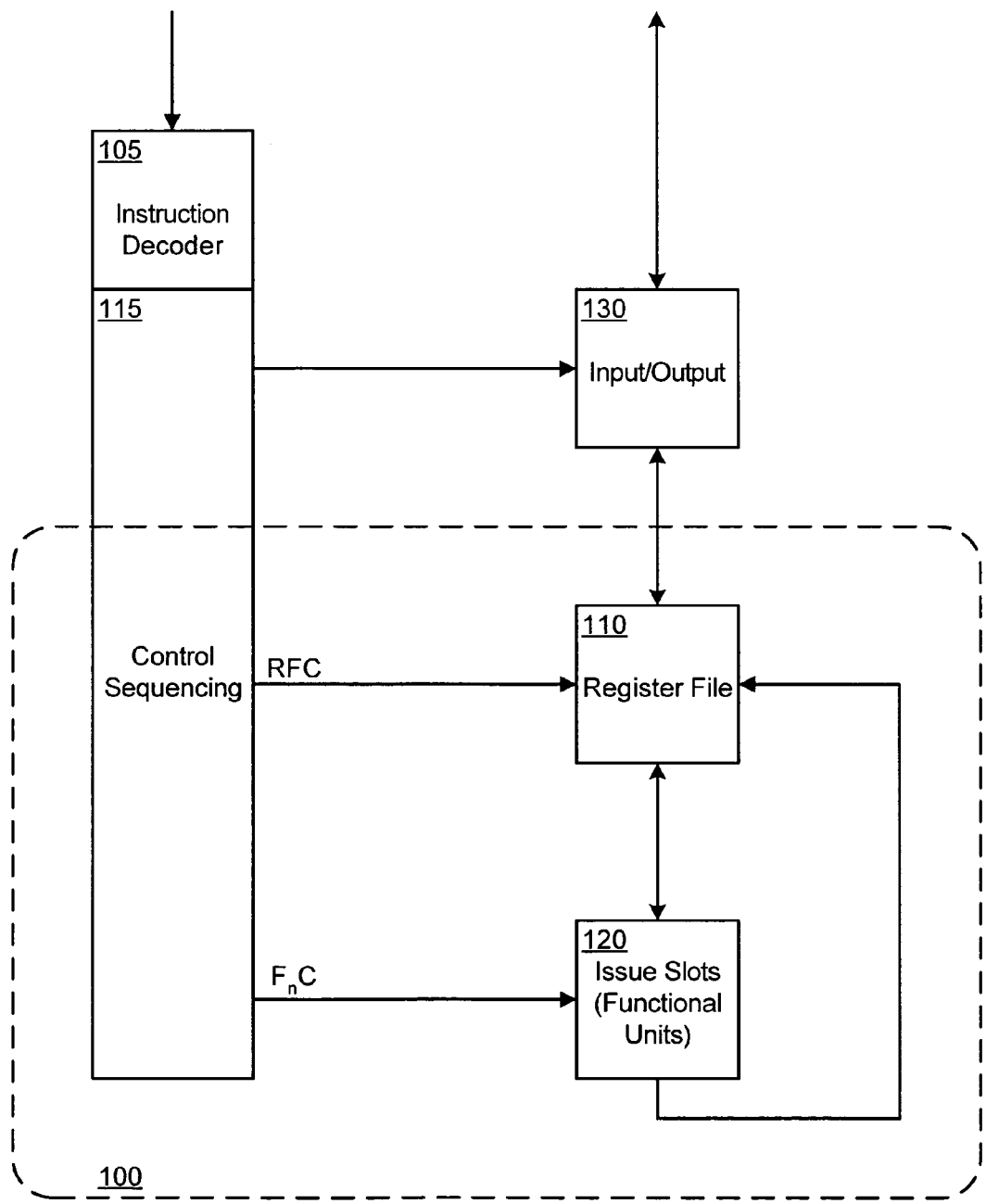
FIG. 1 is a block diagram showing a conventional central processing unit (CPU) or processor.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Instructions in very long instruction word (VLIW) processors usually contain several operand address fields per operation. These high instruction widths result in increased costs for on-chip storage of such instructions. Correspondingly, the high instruction widths decrease system efficiency. This is often the primary limiting factor in system performance.

Figure 4:
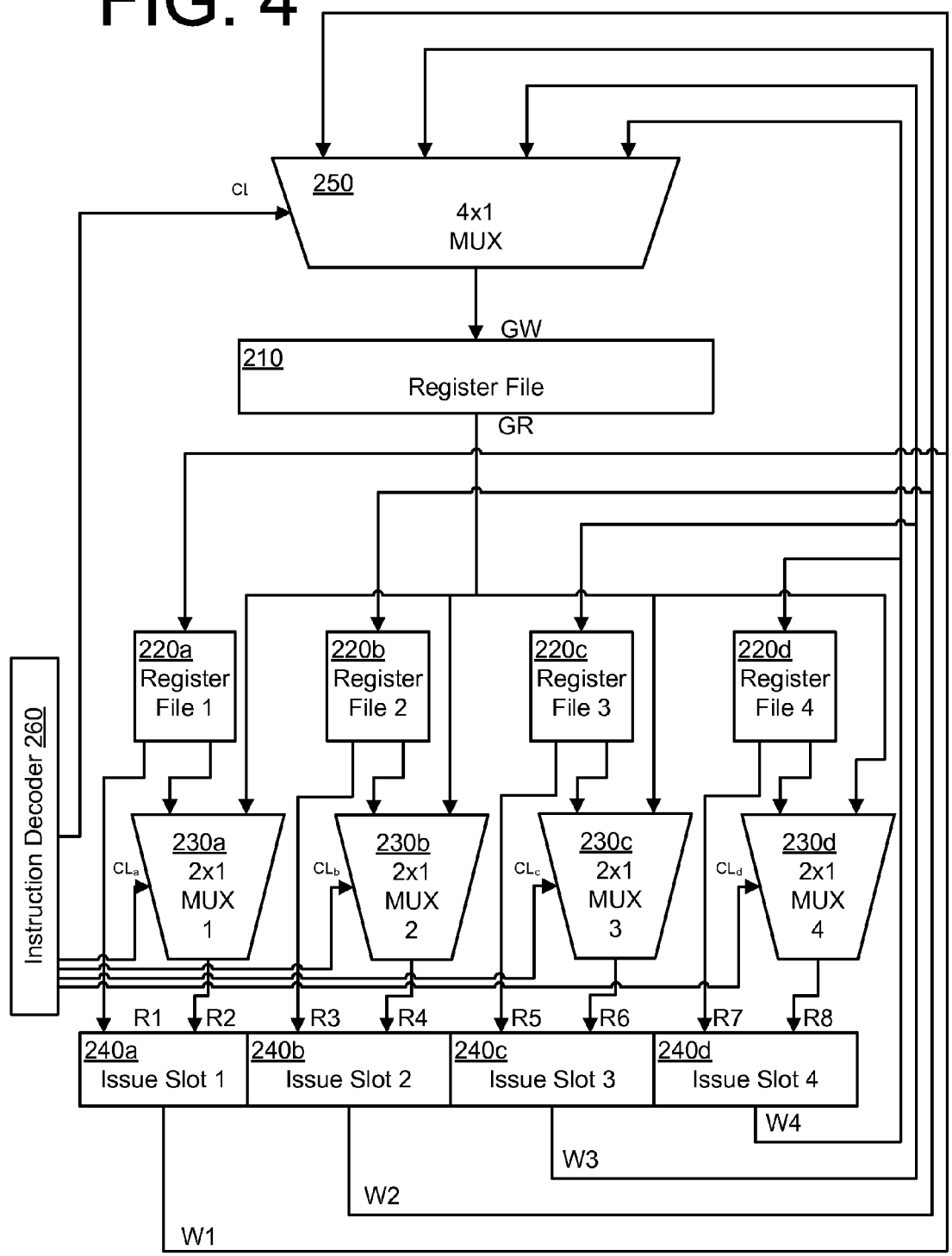
FIG. 4 is a block diagram showing an embodiment of a processor that accommodates shorter instruction words.
Figure 5:
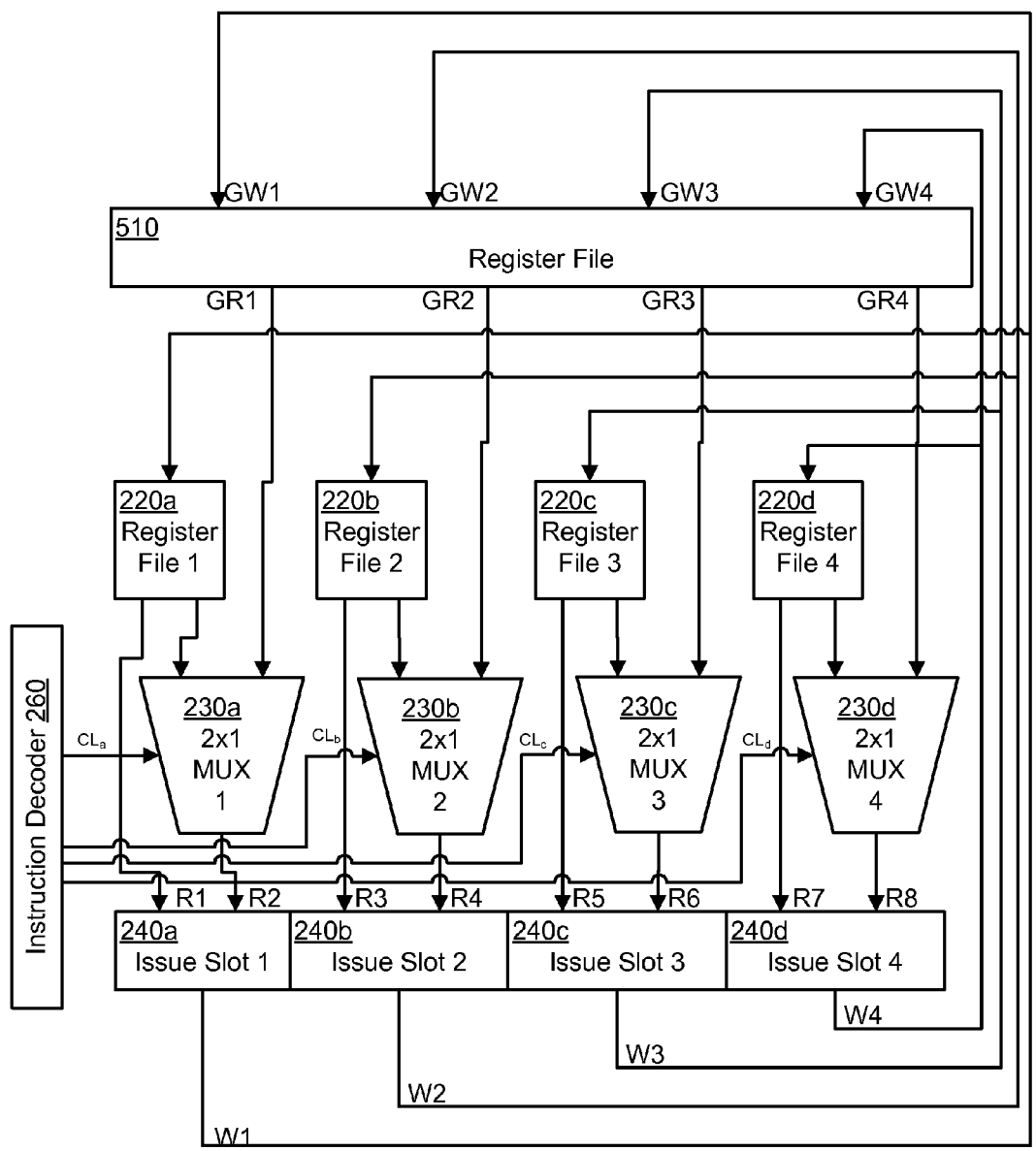
FIG. 5 is a block diagram showing another embodiment of a processor that accommodates shorter instruction words.

Techniques are disclosed in which components are arranged in a specific configuration within the processor space, thereby permitting multiple operations within a single clock cycle with shorter instruction words. The shortened instruction words are accommodated with additional hardware components to the register space of the processor, and an additional preprocessing step, which can be executed by the compiler during code generation. FIGS. 4 and 5 disclose several embodiments of processors, which are configured to accommodate shortened instruction words.

As shown in FIG. 4, the processor space comprises a global register file 210 and multiple local register files 220a . . . 220d, which are strategically arranged to reduce costs associated with on-chip storage of instructions. In order to compare similar on-chip costs, as those shown in the conventional processor 100 of FIG. 2, corresponding register values are chosen for the embodiment of the processor as shown in FIG. 4.

Figure 3:
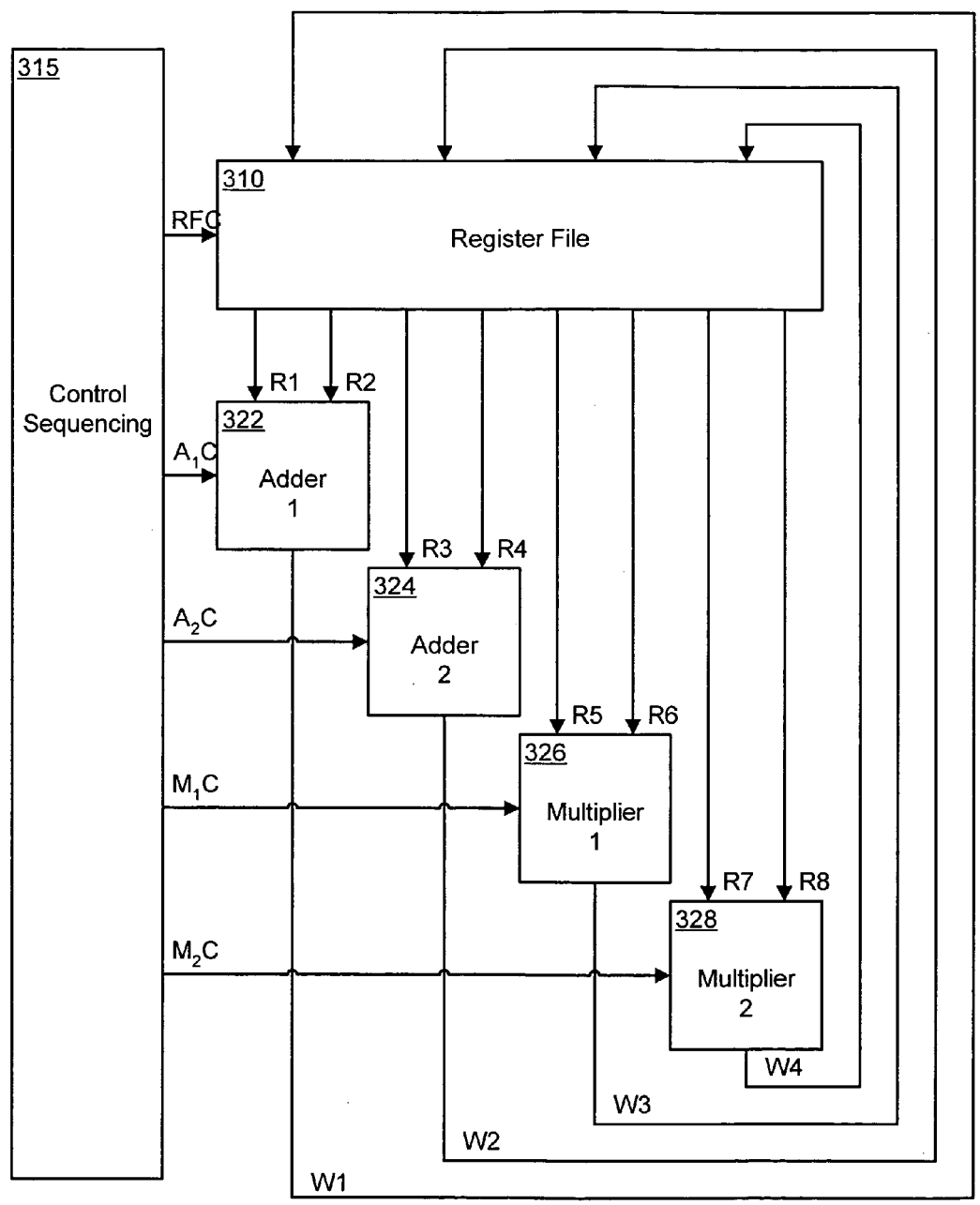
FIG. 3 is a block diagram showing a specific example of the components of FIG. 2.

To make a fairly even comparison, the global register file 210 of FIG. 4 is configured as a sixteen (16) entry, thirty-two (32) bit register file 210 with a single read port GR and a single write port GW. Similarly, the local register files 220a . . . 220d of FIG. 4 are also shown to be 16-entry, 32-bit register files, each with two read ports and a single write port. This particular configuration results in an on-chip cost of:

{(4 local)×(16 entries)×[(32 bits)×(2 read ports+1 write port)]}+{(1 global)×(16 entries)×[(32 bits)×(1 read port+1 write port)]}=, 7168 bits compared to the conventional processor shown in FIG. 3, which resulted in an approximate cost of:

(64 entries)×(32 bits)×(8 read ports+4 write ports)= 24576 bits.

Thus, the processor of FIG. 4 results in approximately a seventy-one percent (71%) reduction in silicon area occupied by the register files.

Furthermore, as shown in FIG. 4, each functional unit (or issue slot) 240a . . . 240d has access to one local register file 220a . . . 220d and the global register file 210. Thus, if each of the local register files 220a . . . 220d and the global register file 210 are configured as 16-entry, 32-bit register files, then each functional unit 220a . . . 220d has access to 32 total registers (i.e., 16 global registers and 16 local registers). Thus, rather than requiring six bits for addressing 64 registers (as shown in FIG. 2), each functional unit requires only five (5) bits for addressing 32 registers.

Figure 2:
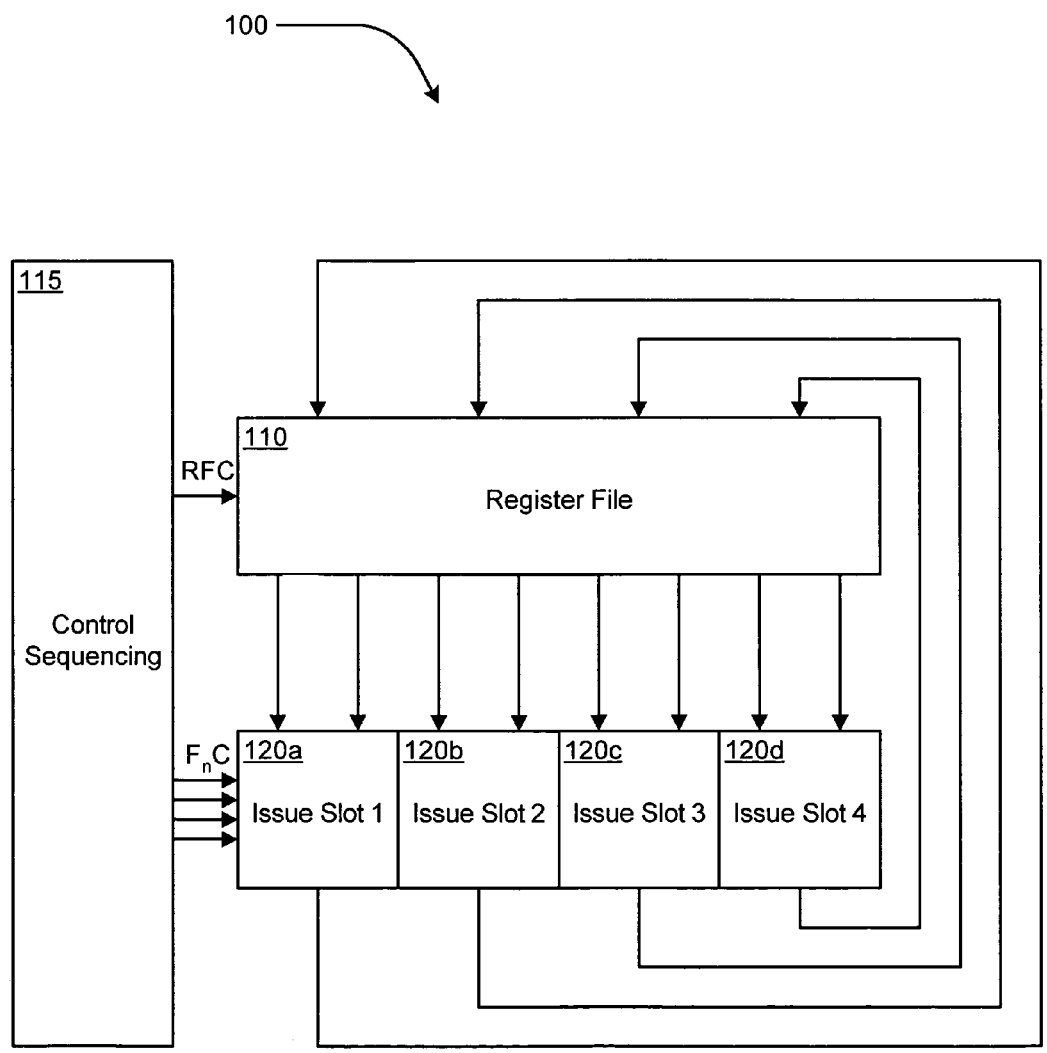
FIG. 2 is a block diagram showing, in greater detail, the general arrangement of the control sequence hardware, the register file, and the functional units of the conventional CPU of FIG. 1.

Thus, unlike the conventional structure of FIG. 2, which required:

(4 instructions/clock) × [2 operation bits +

{(2 input ports + 1 output port)} × 6 address bits] =

80 bit instructions the processor, in the embodiment of FIG. 4, requires:

(4 instructions/clock) × [2 operation bits +

{(2 input ports + 1 output port)} × 5 address bits] =

68 bit instructions

Correspondingly, the size of each instruction (i.e., number of bits in each instruction) decreases by approximately fifteen percent (15%).

More generally, for embodiments that executes k instructions in a single clock cycle, if the operation field is j bits and there are n registers for each register file, then the size of the instruction word would be:

($k$ instructions/clock) ×

($j$ bit operation field + [(2 inputs + 1 output) × (2 × $\sqrt[2]{n \text{ registers}}$)]).

and the corresponding on-chip cost for the register files in the k-instruction-word processor would be:

(k local register files)×(n registers/file×m bits×[2 read+1 write])+(1 global register file)×(n registers/file×m bits×[1 read+1 write])

In order to achieve such an increase in on-chip silicon area, and the corresponding increase in processor efficiency, the layout of the various register files is modified, thereby providing greater access to register space than allowable by conventional processors. One embodiment of the modified layout, as shown in FIG. 4, employs multiplexers (MUXes) 230a . . . 230d that selectively provide input received from the various register files 210, 220a . . . 220d and output to the functional units 240a . . . 240d. Each MUX 230a . . .

230d correspond to a local register file 220a ... 220d and a functional unit 240a ... 240d.

Part of a general k-instruction-word processor is shown in FIG. 4, where k is any non-negative integer. Such a k-instruction-word processor includes k functional units. Each functional unit has a first read input, a second read input, and a write output. In the particular embodiment of FIG. 4, the value of k is 4, thereby permitting execution of four (4) instructions per clock cycle by the four functional units 240a ... 240d.

Corresponding to the k functional units, the k-instruction-word processor includes k2×1 MUXes. Each 2×1 MUX corresponds to one of the functional units, and each 2×1 MUX has a first input, a second input, and an output that is electrically coupled to the second read input of its corresponding functional unit. Additionally, each 2×1 MUX includes a control line $CL_a$ ... $CL_d$ for selecting one of the two inputs. The control lines $CL_a$ ... $CL_d$ are connected to an instruction decoder 260. Again, for FIG. 4, where k=4, there are four 2×1 MUXes 230a ... 230d.

Along with the k 2×1 MUXes, the k-instruction-word processor includes k local register files, each of which corresponds to a respective 2×1 MUX and a respective functional unit. Each of the k local register files comprises n registers, and each register is capable of storing m bits. It should be appreciated that n and m are non-negative integers. Preferably, n is a power of 2. Each local register file has at least two read ports. The first local read port is electrically coupled to the first read input of its corresponding functional unit, while the second local read port is electrically coupled to the first input of its corresponding 2×1 MUX. In addition to the read ports, each register file has a local write port, which is electrically coupled to the write output of its corresponding functional unit. Shown in FIG. 4 are the four local register files 220a ... 220d, which correspond to their respective 2×1 MUXes 230a ... 230d and their respective functional units 240a ... 240d.

The k-instruction-word processor further includes a k-input-one-output (k×1) MUX. Each of the k inputs is electrically coupled to one of the k functional units, such that the write outputs of the k functional units appear on the corresponding k inputs of the k×1 MUX. The k×1 MUX has a control line $CL_k$ connected to the instruction decoder 260 for selecting one of the k inputs. The selected input is placed on the output of the k×1 MUX. Thus, given k=4, the output of the first functional unit 240a is placed on the first input of the 4×1 MUX 250; the output of the second functional unit 240b is placed on the second input of the 4×1 MUX 250; the output of the third functional unit 240c is placed on the third input of the 4×1 MUX 250, and so on.

The k-instruction-word processor further includes a global register file of n registers. Each of the n registers is an m-bit register. The global register file has a global read port and a global write port. The global write port is coupled to the output of the k×1 MUX, and, hence, the output of the k×1 MUX appears at the write port of the global register file. The read port of the global register file is electrically coupled to the second input of each 2×1 MUX.

While the configuration of FIG. 4 includes additional components, such as the various MUXes 250, 230a ... 230d, it should be appreciated that greater efficiency can be achieved with relatively few added components.

The performance of the k-instruction-word processor of FIG. 4 can be improved by multi-porting each of the register files. While multi-porting of register files may increase performance, the addition of multiple ports on the register files also increases the on-chip costs. One embodiment, among others, of multi-ported register files is shown with reference to FIG. 5.

As shown in FIG. 5, the 4×1 MUX 250 and the 1-read-1-write global register file 210 of FIG. 4 are substituted with a single 4-read-4-write global register file 510. Given such a substitution, each of the functional units 240a ... 240d now write their outputs W1, W2, W3, W4 onto a corresponding write input GW1, GW2, GW3, GW4 on the global register file 510.

Thus, for k-instruction-word processors, a k-read-k-write global register file would be employed. Correspondingly the on-chip cost would be calculated as:

(k local register files)×(n registers/file×m bits×[2 read+1 write])+, (1 global register file)×(n registers/file×m bits×[k read+k write])

and, more specifically for a 4-instruction-word processor, the on chip costs would be:

$$(4 \text{ local register files}) \times (16 \text{ registers/file} \times 32 \text{ bits} \times [2 \text{ read} + 1 \text{ write}]) +$$
$$(1 \text{ global register file}) \times$$
$$(16 \text{ registers/file} \times 32 \text{ bits} \times [4 \text{ read} + 4 \text{ write}]) = 10240 \text{ bits.}$$

As shown in the embodiments of FIGS. 4 and 5, for a machine that has n registers and is capable of issuing k instructions per clock cycle, the single bank of registers in conventional processors is replaced by approximately k banks of n/(k+1) registers, each dedicated to one functional unit (or issue slot). Additionally a global bank of registers is provided for access by instructions in any of the functional units. This rearrangement of the processor space results in considerable savings for on-chip silicon area, and also results in a reduction of the instruction-word size. Since the performance for many high-speed processors is limited by the size (or width) of the instruction word, the performance can be improved by providing a hardware configuration that accommodates smaller instruction words.

Although exemplary embodiments have been shown and described, it will be clear to those of ordinary skill in the art that a number of changes, modifications, or alterations to the invention as described may be made. For example, while embodiments having 32-bit registers are disclosed, those having skill in the art will appreciate that registers of various sizes can be used without adverse effect to the scope of the invention. For instance, 8-bit registers, 16-bit registers, 24-bit registers, 64-bit registers, 128-bit registers, or any arbitrary m-bit register, where m is an integer, can easily be substituted for the 32-bit registers.

Likewise, while 64 registers are shown in a preferred embodiment, it should be appreciated that the number of registers can be varied to accommodate various design needs. In that regard, it should be appreciated that the number of register banks is not intended as a limitation, but merely provided for illustrative purposes, and that n register banks, where n is an integer, can be implemented.

Similarly, while a machine that issues four (4) instructions per clock cycle is shown, those having skill in the art will appreciate that machines that issue multiple instructions, regardless of the number of concurrently-issued instructions, can be designed using the disclosed structures. In that regard, it should be appreciated that any k-instruction machine, where k is an integer, can be designed in accordance with the disclosed embodiments. Moreover, while instructions having 2-bit operation fields are shown in the disclosed embodiments, those having skill in the art will appreciate that any j-bit operation field, where j is an integer, can easily be implemented. It should also be appreciated that j, k, m, and n can be any integer value. In that regard, j, k, m, and n can be different integer values or, in some cases, can be the same integer value.

Also, given the disclosed architecture, one having ordinary skill in the art will be able to determine the corresponding preprocessing steps required by the compiler during code generation. Hence, those details are not discussed herein.

All such changes, modifications, and alterations should therefore be seen as within the scope of the disclosure.

What is claimed is:

1. A system for executing instructions, the system comprising:
   1) k functional units, with k being an integer, each functional unit comprising:
      a) a first read input;
      b) a second read input; and
      c) a write output;
   2) k 2-input-1-output (2×1) multiplexers, each 2×1 multiplexer corresponding to one of the k functional units, each 2×1 multiplexer comprising:
      a) a control line;
      b) a first input;
      c) a second input; and
      d) an output electrically coupled to the second read input of its corresponding functional unit;
   3) k local register files, each local register file corresponding to one of the k 2×1 multiplexers, each local register file further corresponding to one of the k functional units, each local register file comprising:
      a) n registers, with n being an integer, each of then registers being an m-bit register, with m being an integer;
      b) a first local read port electrically coupled to the first read input of its corresponding functional unit;
      c) a second local read port electrically coupled to the first input of its corresponding 2×1 multiplexer; and
      d) a local write port electrically coupled to the write output of its corresponding functional unit; and
   4) a global register file comprising:
      a) n registers, each register being an m-bit register;
      b) a global read port electrically coupled to the second input of each 2×1 multiplexer; and
      c) a global write port; and
   5) a k-input-1-output (k×1) multiplexer comprising:
      a) a control line;
      b) k inputs, each input corresponding to one of the k functional units, each input being electrically coupled to the write output of its corresponding functional unit; and
      c) an output electrically coupled to the global write port of the global register file.

2. The system of claim 1, further comprising:
   6) an instruction decoder electrically coupled to the control line of each 2×1 multiplexer, the instruction decoder further being electrically coupled to the control line of the k×1 multiplexer, the instruction decoder being configured to provide a local control input to the 2×1 multiplexer, the instruction decoder further being configured to provide a global control input to the k×1 multiplexer, the local control input being correlated to the global control input.

3. The system of claim 1, m is a power of 2.

4. The system of claim 1, n is a power of 2.

5. The system of claim 1, k is a power of 2.

6. A system for executing instructions, the system comprising:
   1) k functional units, with k being an integer, each functional unit comprising:
      a) a first read input;
      b) a second read input; and
      c) a write output;
   2) k 2-input-1-output (2×1) multiplexers, each 2×1 multiplexer corresponding to one of the k functional units, each 2×1 multiplexer comprising:
      a) a control line;
      b) a first input;
      c) a second input; and
      d) an output electrically coupled to the second read input of its corresponding functional unit;
   3) k local register files, each local register file corresponding to one of the k 2×1 multiplexers, each local register file further corresponding to one of the k functional units, each local register file comprising:
      a) n registers, with n being an integer, each of then registers being an m-bit register, with m being an integer;
      b) a first local read port electrically coupled to the first read input of its corresponding functional unit;
      c) a second local read port electrically coupled to the first input of its corresponding 2×1 multiplexer; and
      d) a local write port electrically coupled to the write output of its corresponding functional unit; and
   4) a global register file comprising:
      a) n registers, each register being an m-bit register;
      b) k global read ports, each global read port corresponding to one of the k 2×1 multiplexers, each global read port being electrically coupled to the second input of its corresponding 2×1 multiplexer; and
      c) k global write ports, each global write port corresponding to one of the k functional units, each global write port being electrically coupled to the write output of its corresponding functional unit.

7. The system of claim 6, further comprising:
   an instruction decoder electrically coupled to the control line of each 2×1 multiplexer, the instruction decoder being configured to provide a local control input to the 2×1 multiplexer.

8. The system of claim 6, m is a power of 2.

9. The system of claim 6, n is a power of 2.

10. The system of claim 6, k is a power of 2.

* * * * *